United States Patent [19]

Krause

[11] Patent Number: 5,376,742
[45] Date of Patent: Dec. 27, 1994

[54] MONOMER RECOVERY IN GAS PHASE FLUID BED OLEFIN POLYMERIZATION

[75] Inventor: Stephen J. Krause, Oregonia, Ohio

[73] Assignee: Quantum Chemical Corporation, Cincinnati, Ohio

[21] Appl. No.: 125,961

[22] Filed: Sep. 23, 1993

[51] Int. Cl.$^5$ ............................................. C08F 2/34
[52] U.S. Cl. ........................................ 526/68; 526/901
[58] Field of Search ............................. 526/68, 901

[56] References Cited

U.S. PATENT DOCUMENTS

| | | | |
|---|---|---|---|
| 3,922,322 | 11/1975 | Roger et al. | 260/93.7 |
| 4,003,712 | 1/1977 | Miller | 526/68 |
| 4,011,382 | 3/1977 | Levin et al. | 526/96 |
| 4,029,877 | 6/1977 | Yoshiura et al. | 528/483 |
| 4,272,270 | 6/1981 | Higgins | 62/24 |
| 4,332,933 | 6/1982 | DiDrusco et al. | 528/500 |
| 4,372,758 | 2/1983 | Bobst et al. | 528/483 |
| 4,375,367 | 3/1983 | Prentice | 62/13 |
| 4,442,271 | 4/1984 | Rau et al. | 526/68 |
| 4,461,634 | 7/1984 | Duckett et al. | 62/11 |
| 4,499,263 | 2/1985 | Messura et al. | 528/483 |
| 4,588,790 | 5/1986 | Jenkins, III et al. | 526/67 |
| 4,727,122 | 2/1988 | Lee et al. | 526/68 |
| 4,758,654 | 7/1988 | Brod et al. | 528/483 |
| 5,242,999 | 9/1993 | Takakarhu et al. | 526/68 |

FOREIGN PATENT DOCUMENTS

0127253A1 12/1984 European Pat. Off. .
0188125A2 7/1986 European Pat. Off. .

Primary Examiner—Judy M. Reddick
Assistant Examiner—Tom Weber
Attorney, Agent, or Firm—William A. Heidrich

[57] ABSTRACT

Unreacted monomer present in an ethylene/$C_3$–$C_8$ alpha-olefin copolymer product produced in a catalyzed fluid bed polymerization process is purged with a gaseous stream obtained by subjecting a portion of the gaseous effluent from the fluidized bed to a partial condensation, separating the liquid phase from the gaseous phase obtained and employing the gaseous phase as the gas to purge unreacted monomer from the copolymer product.

8 Claims, 1 Drawing Sheet

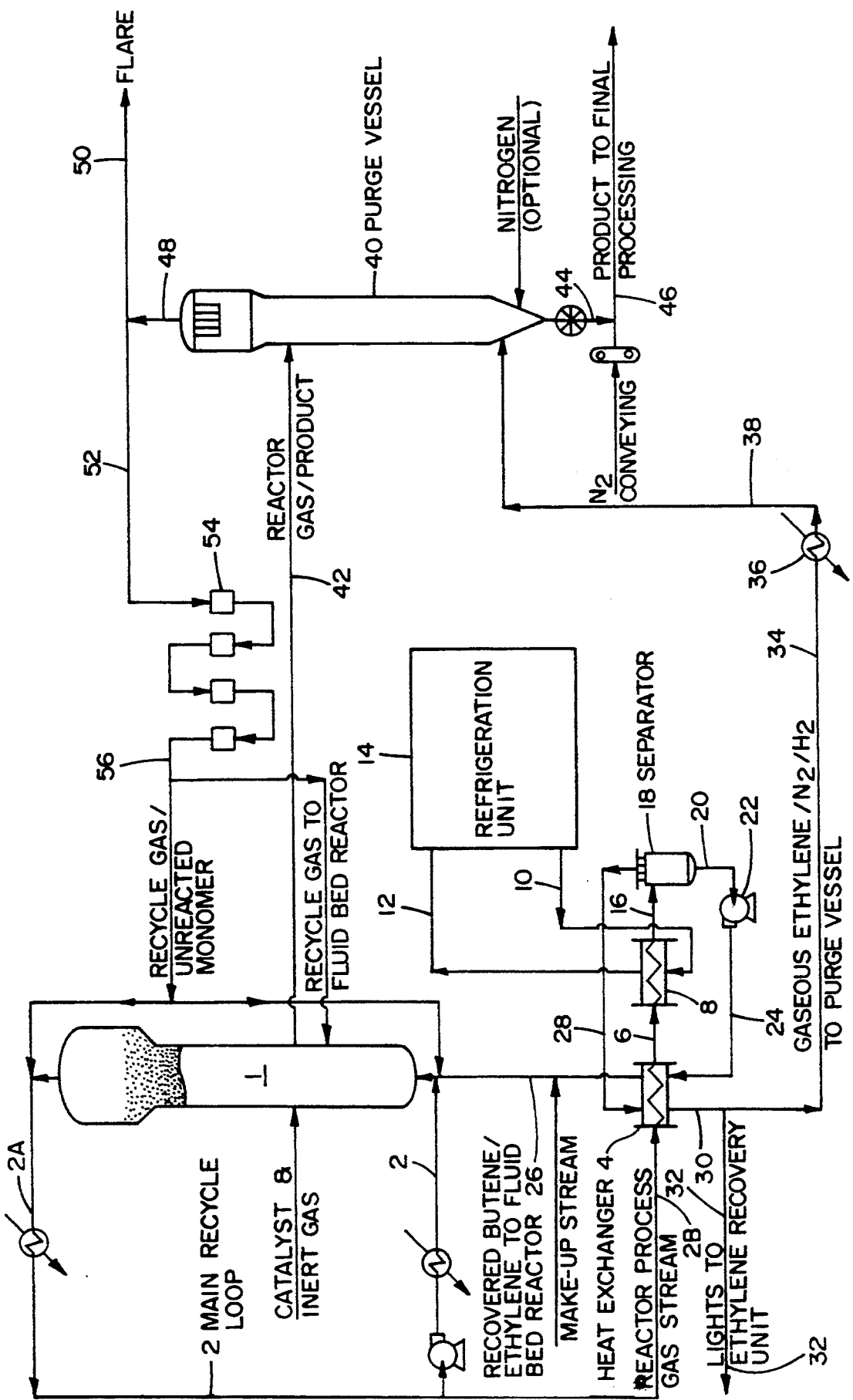

MONOMER RECOVERY IN GAS PHASE FLUID BED OLEFIN POLYMERIZATION

BACKGROUND OF THE INVENTION

1. Field of the Invention

This invention relates to the gas phase fluid bed polymerization of olefins. More particularly, this invention relates to minimizing the venting or flaring of unreacted monomer. This invention especially relates to recovery of unreacted monomer from effluent gases and employing such recovered gases to purge unreacted monomer from the polymer product.

2. Description of the Prior Art

Olefin polymerization has been practiced commercially for a number of years. Polymers have been produced successfully by both continuous and batch processes employing such techniques as solution polymerization, slurry polymerization and polymerization in loop reactors.

For several years considerable interest has been shown in the commercial development of gas phase olefin polymerization. One particularly useful technique has been employing a fluidized bed reactor for the catalytic polymerization of gaseous monomers to produce solid particulate polymers. Fluidized bed reactors for the production of particulate polymers can be operated by continuously feeding a dry, powdery catalyst and a gaseous stream containing the polymerizable monomer or monomers to a fluidized bed composed of the particulate polymer product. The polymer is kept in a fluidized state in a rising stream of the gaseous feed mixture containing the olefin or olefins to be polymerized. The unreacted monomers and any carrier gas which may be employed are passed out of the reaction vessel and recycled, at least in part, and returned to the bottom of the reactor where additional gaseous feed is introduced. The combined mixtures are passed through the fluidized bed of polymer to maintain it in a fluidized state and continue the polymerization reaction. The exothermic heat of reaction from the polymerization is conveniently removed by passing the recycling gaseous mixture through appropriate heat exchange equipment before it is returned to the lower portion of the reactor. The polymer product produced may be conveniently removed from the fluidized bed reactor by a series of lockhopper and valve arrangements.

The patent art contains numerous patents related to fluid bed olefin polymerization, especially the polymerization of alpha-olefins, such as ethylene alone or in combination with other alpha-olefins, particularly $C_3$–$C_8$ alpha-olefins, see, e.g., U.S. Pat. Nos. 3,922,322 of Roger, et al.; 4,003,712 of Miller and 4,011,382 of Levine, et al.

A quantity of unreacted monomers usually remains in or on the particle of olefin polymer product removed from the reactor. These unreacted monomers should be removed from the polymer product, since they can present a danger of explosion in contained spaces such as product storage silos or tank cars if the unreacted monomer concentration reaches dangerous levels in the presence of oxygen. Further, environmental standards concerning hydrocarbon emissions require effective and proper disposal of any unreacted monomer removed from the polymer product.

The prior art teaches a number of techniques for removing unpolymerized monomers from the polymers prepared from the corresponding monomers. For example, U.S. Pat. No. 4,372,758 of Bobst, et al. discloses a degassing or purging process employing an inert gas, such as nitrogen, for removal of unpolymerized gaseous monomer from solid olefin polymers, particularly those produced in a gaseous phase polymerization. Solid polymer is conveyed to the top of a purge vessel by means of an inert gas stream, an inert gas stream is introduced into the bottom of the purge vessel in such a fashion that the solid polymer is counter-currently contacted with the inert gas purge stream to strip away the gaseous monomers from the solid polymer, and the resulting stream of inert gas and unreacted gaseous monomer is recovered from the purge vessel. The resulting stream or a portion thereof may serve as the conveying gas or, in another embodiment, as the purge stream.

In addition, since the polymer is produced in a fluidized bed operating at above atmospheric pressure, the removal of the polymer from the reactor to a zone of atmospheric pressure necessarily removes a significant quantity of the unreacted monomer merely because of the change in pressure.

Regardless of the technique involved, the unreacted monomer is often admixed with an inert gas stream which, depending upon circumstances, is often passed to a flare for disposal or vented to the atmosphere. Regardless of the technique employed, the unreacted monomer represents a significant loss of monomer which in other instances could be recycled for reaction within the fluidized bed, and the concomitant flaring or venting of the inert gas represents a not insignificant operating cost, as well as a desirably avoided environmental factor.

It is an object of this invention to provide a process for the removal of unreacted monomer from a polymer product by a technique which permits the recycling of the unreacted monomer to the reaction vessel.

It is another object of this invention to minimize or eliminate the flaring or venting of unreacted monomer from a fluid bed olefin polymerization process.

It is a further object of this invention to minimize or eliminate the quantity of inert gas employed for transporting polymer product within the polymerization plant and for purging unreacted monomer from the polymer product.

The achievement of these and other objects will be apparent from the following description of the subject invention.

SUMMARY OF THE INVENTION

This invention relates to improvements in a fluidized bed gas phase olefin polymerization process of the type wherein ethylene is catalytically copolymerized with a $C_3$–$C_8$ alpha-olefin monomer to provide an ethylene/$C_3$–$C_8$ olefin copolymer product containing unreacted gaseous monomers by passing a gaseous mixture comprising ethylene and a $CC_3$–$C_8$ alpha-olefin monomer through the fluidized bed as the fluidizing medium under effective polymerization conditions to provide the ethylene/$C_3$–$C_8$ olefin copolymer product containing unreacted gaseous monomer and a gaseous effluent stream comprising unreacted ethylene and the unreacted $C_3$–$C_8$ alpha-olefin monomer, passing the gaseous effluent stream from the fluidized bed, recycling at least a first portion of said gaseous effluent stream to the fluidized bed as at least a portion of the gaseous mixture being passed through the fluidized bed and counter-currently contacting the copolymer product with a first gas stream to produce (i) a copolymer product having a reduced amount of said unreacted gaseous monomers and (ii) a second gas stream comprising said first gas stream and at least a portion of said unreacted gaseous monomers, the improvement which comprises:

(a) cooling a second portion of said gaseous effluent stream passing from the fluidized bed to partially condense said gaseous effluent stream to provide (1) a first liquid stream comprising a major portion of the unreacted $C_3$–$C_8$ alpha-olefin monomer in said second portion and (2) a third gas stream comprising a major portion of the unreacted ethylene in said second portion, and (b) utilizing said third gas stream as the first gas stream for counter-currently contacting the copolymer product.

BRIEF DESCRIPTION OF THE DRAWING

The drawing is a schematic flowplan of an embodiment of the subject invention.

DESCRIPTION OF THE PREFERRED EMBODIMENTS

The present invention relates to improvements in the process of catalytic polymerization of ethylene and a second alpha-olefin by means of a fluidized bed technique. In particular, the improvements are directed to minimizing the quantity of unreacted monomer which is flared or vented in present commercial operations. As often practiced, the unreacted monomer remaining in the copolymer product is removed by pressure reduction and/or purging the polymer product with an inert gas stream, preferably by passing the inert gas in countercurrent relationship with the polymer product. To avoid a buildup of the inert gas stream in the gaseous circuit of the fluidized bed polymerization, the inert gas containing the purged monomers is conventionally either vented to the atmosphere, where environmental considerations permit such a technique, or by passing the gaseous mixture to a flare for combustion of the monomers. In either event the loss of unreacted monomer which could otherwise be recycled requires the purchase of additional monomer which results in an additional operating expense. Similarly, the venting or flaring of inert gas represents a significant operating expense.

Since the gaseous effluent passing from the fluidized bed is conventionally employed as a means for removing the exothermic heat of reaction and also is recycled to the fluidized bed for conversion of unreacted monomers, this gas stream provides a source of material which could replace or eliminate the use of the inert gas stream for removing unreacted monomer from the polymer product. This gaseous effluent stream normally contains, in addition to ethylene and the comonomer, quantities of hydrogen, nitrogen and ethane. Thus, where the comonomer is one of the $C_3$–$C_8$ alpha-olefins, that particular alpha-olefin will be present in the gaseous effluent leaving the fluid bed reactor. The unreacted monomer present in the copolymer product consists mostly of the $C_3$–$C_8$ olefin monomer, because this monomer has a lower vapor pressure than ethylene. During the removal from the reactor, the change in pressure causes essentially all of the unreacted ethylene to pass from the copolymer product resulting in the $C_3$–$C_8$ comonomer being the principal unreacted monomer associated with the copolymer. Since the gas stream which will serve as the source of the purge gas contains both ethylene and the $C_3$–$C_8$ comonomer, while the gas to be removed from the copolymer is mostly the $C_3$–$C_8$ comonomer, more $C_3$–$C_8$ monomer can be purged and in a simpler fashion with an essentially ethylene stream vis-a-vis a mixed ethylene/$C_3$–$C_8$ comonomer stream or an essentially $C_3$–$C_8$ comonomer stream. Further, since void spaces frequently occur in the body of copolymer powder collecting in the bottom of the purge vessel, to minimize gas losses from the bottom of this vessel, it is better to employ the lighter ethylene monomer as the purge gas.

Thus, the general concept here involves removing a portion of the gaseous effluent passing from the fluid bed reactor and subjecting this stream to a cooling operation to partially condense the stream so as to separate the lighter monomer, ethylene, from the heavier $C_3$–$C_8$ comonomer. The stream containing the $C_3$–$C_8$ monomer can then be recycled for reuse in the fluid bed reactor, while the stream containing the ethylene can be employed as the purge gas. After purging the unreacted monomer from the polymer product, the gas stream containing the ethylene, together with the purged unreacted monomer, is also recycled to the inlet to the fluid bed reactor to be combined with the other gaseous streams being introduced as the fluidizing medium into the reactor where the unreacted monomers will be subjected to polymerization in the fluidized bed. Thus, not only is the need for an inert gas stream minimized, but the unreacted monomers are recovered to serve as part of the feed to the polymerization reactor rather than being vented or flared.

The subject invention thus is particularly useful in ethylene copolymerization. Although the preferred comonomers are the $C_3$–$C_8$ alpha-olefins, the particularly preferred ones are butene-1, hexene-1 and 4-methylpentene-1, i.e., $C_4$ and $C_6$ alpha-olefins.

The partial condensation of the gaseous effluent can be achieved completely in a single heat exchanger, but it has been found to be more efficient to employ a two-step partial condensation where an initial cooling of the stream is effected in a first heat exchanger by passing the subsequently partially condensed stream in counter-current indirect heat exchange with the incoming gaseous effluent to achieve an initial cooling step of this gaseous stream. The cooled gaseous stream is then introduced into a second heat exchanger where it is passed in counter-current indirect heat exchange with a cold refrigerant to achieve condensation of a major portion of the heavier alpha-olefin present in the gaseous stream.

Partial condensation techniques and the use of commercial refrigerants, heat exchangers, condensers and partial condensers are well known in the art. U.S. Pat. No. 4,461,635 of Duckett, et al. discloses the partial condensation of a multicomponent gas stream and the subsequent use of the separated condensate and uncondensed vapor to cool the incoming gas feed mixture (see abstract in Column 4, Lines 53–68). Although a separate refrigeration system is employed in Duckett, et al. to effect condensation, the refrigerant is employed in a fashion such that it is both evaporated and condensed while being passing in indirect contact with the streams to be cooled and separated by partial condensation. The use of an enclosed refrigeration system to condense or partially condense a gaseous stream is also disclosed in other prior art. See, for example, U.S. Pat. No. 4,272,270 of Higgins (FIG. 3) and U.S. Pat. No. 4,375,367 of Prentice (FIG. 1 and Column 4, Lines 41–43). However, these three patents do not teach or suggest the use of the techniques disclosed herein in a fluid bed olefin polymerization process or as a means to produce a gaseous stream which can replace an inert gas purge stream employed to remove unreacted monomer from a copolymer product.

The improvements described herein can be illustrated by reference to the drawing which presents a flowplan depicting an embodiment of this invention. This embodiment involves the copolymerization of ethylene and butene-1. The butene copolymer has been employed for illustrative purposes. One skilled in the art can appreciate that the techniques described and disclosed are equally applicable to the copolymerizations of ethylene with any of the other $C_3$–$C_8$ alpha-olefins employed in ethylene copolymerization, particularly copolymerization employing fluidized bed techniques. The copolymerization suitably employs a catalyst system of a solid compound of titanium in combination with a magnesium compound associated with a prepolymer support or an inorganic oxide support such as silica, and a cocatalyst of an organo-aluminum compound. The reaction mixture consists of gaseous ethylene and butene-1 together with sufficient quantities of hydrogen employed as a chain terminator and an inert carrier gas of nitrogen. The polymerization is conducted at a temperature of about 160°–210° F. and a pressure of about 300–400 psig. Unreacted monomer associated with the ethylene-butene-1 copolymer product is purged from the product by being passed in counter-current relationship with an inert gas stream of nitrogen. The nitrogen purge stream together with the unreacted monomers purged from the polymer product are sent to a flare for disposition. These features, in accordance with the subject invention, are depicted in the flowplan of the drawing in which a portion of the reactor process gas stream leaving the top of the fluid bed reactor 1 is removed therefrom through line 2A and recycled to the reactor (Main Recycle Loop) through line 2. A small portion, e.g. 1 to 5%, of the recycle stream is passed to heat exchanger 4. This gaseous stream contains substantial quantities of nitrogen, ethylene and butene, a small quantity of hydrogen and a trace of ethane and will serve as the source of the gas employed to purge unreacted monomer from the ethylene-butene-1 copolymer product. Returning to heat exchanger 4, the process gas stream is cooled from 160° F. to about 61° F. by being passed in indirect heat exchange with cold portions of the process gas stream which have previously been subjected to cooling and partial condensation (as hereinafter described). This cooling in heat exchanger 4 also causes the condensation of about 13 mole % of the process gas stream. The heat duty on heat exchanger 4 is about 94,000 BTUs per hour. The cooled and partially condensed process gas stream flows through line 6 to partial condenser 8 where it is subjected to indirect heat exchange with a mechanically cooled refrigerant stream. The heat duty on partial condenser 8 is approximately 74,000 BTUs per hour which results in cooling the process gas stream to a temperature of about 0° F. which produces the required partial condensation. The refrigerant is supplied to the partial condenser by means of lines 10 and 12 by Freon self-contained refrigeration unit 14. This refrigeration unit of approximately 10 tons of refrigeration or 120,000 BTUs per hour provides the refrigerant to partial condenser 8 at a temperature of about −10° F. The partially condensed reactor process gas stream at a temperature of about 0° F. passes from partial condenser 8 through line 16 to separator 18 where the liquid phase (about 28 mole and the gaseous phase (about 72 mole %) of the partially condensed gas stream are separated. The liquid phase contains the majority (about 90%) of the heavier butene-1 comonomer as well as a significant quantity (about 28%) of the ethylene in the process gas stream and trace amounts of ethane, hydrogen and nitrogen. The gaseous phase separated and removed in separator 18 contains a majority of the ethylene (about 72%) substantially all (about 97–99%) of the hydrogen and nitrogen, a small quantity (about 10%) of the butene and a small amount of ethane from the process gas stream. The condensed liquid portion of the reactor process gas stream passes from separator 18 through line 20 and is pumped by pump 22 through line 24 at a temperature of about 0° F. to heat exchanger 4 where it passes through a portion of the heat exchanger to cool the incoming process gas stream. The condensed stream containing a majority of the butene and some ethylene, now at a temperature of about 127° F. and now with about 71 mole % in the liquid phase, passes from heat exchanger 4 through line 26 for recycle to the fluid bed reactor where it will be combined with the feed mixture.

The gaseous stream containing a majority of the ethylene in the portion of the process gas stream flows from separator 18 through line 28 to heat exchanger 4 where it passes in indirect heat exchange relationship with the incoming reactor process gas stream to provide the initial cooling to that stream. The gaseous stream leaves heat exchanger 4 at a temperature of about 127° F. through line 30. Where the quantity of this gaseous stream is more than sufficient for use in purging the copolymer product, excess quantities may be removed therefrom through line 32 for recovery in the ethylene recovery unit (not shown). The remaining portion of the gaseous stream containing the majority of the ethylene, nitrogen and hydrogen passes through line 34 for eventual use in purging the copolymer product. This gas stream is heated to about 160° F. by passing it through steam heated heat exchanger 36 prior to its contacting the copolymer product. The gas stream then passes through line 38 and enters the lower section of purge vessel 40. At the same time a quantity of ethylene-butene copolymer product together with about 140 moles/hour of reactor gas has been passed from the reactor through line 42 to the top section of purge vessel 40. Inert gas, such as nitrogen, is optionally injected into purge vessel 40 below the point of entry of line 38 to facilitate the process as needed to increase removal of unreacted monomers. The copolymer product enters purge vessel 40 and passes down through purge vessel 40 contacting the gas stream in counter-current fashion as the gas passes up through the purge vessel. During this intimate contacting, the gas stream purges unreacted monomer (mostly butene) from the copolymer product. The copolymer product purged of substantially all of the unreacted monomer passes from the bottom of purge vessel 40 through line 44 where it is contacted with an inert gas stream, nitrogen, which conveys the copolymer product through line 46 to final processing (not shown) which may include the addition of additives by means of extrusion, final pelleting and shipment. The gas stream, together with the unreacted monomer purged from the copolymer product and the reactor gas which accompanied the polymer product when it entered the purge vessel, is passed from the top of purge vessel 40 through line 48. Quantities of this stream may be passed through line 50 to the flare for disposal in emergency situations or where the stream is in excess of required quantities. In the usual situation, the purge stream containing the gas stream, the unreacted monomer and the remainder of the reactor gas stream, is passed through line 52 and then through recycle compressor 54 which delivers this gaseous stream at reactor operating pressure through line 56 to the polymerization reactor where it is combined with the feed mixture for reaction within the fluidized bed.

Modifications and variations of the invention as hereinbefore set forth may be made without departing from the spirit and scope thereof. Therefore, only such limitations should be imposed on the invention as are indicated in the appended claims.

What is claimed is:

1. In a fluidized bed gas phase olefin polymerization process wherein ethylene is catalytically copolymerized with a $C_3$–$C_8$ alpha-olefin monomer to provide an ethylene/$C_3$–$C_8$ olefin copolymer product containing unreacted gaseous monomers by passing a gaseous mixture comprising ethylene and a $C_3$–$C_8$ alpha-olefin monomer through the fluidized bed as the fluidizing medium under effective polymerization conditions to provide the ethylene/$C_3$–$C_8$ olefin copolymer product containing unreacted monomer and a gaseous effluent stream comprising unreacted ethylene and the unreacted $C_3$–$C_8$ alpha-olefin monomer, passing the gaseous effluent stream from the fluidized bed, recycling at least a first portion of said gaseous effluent stream to the fluidized bed as at least a portion of the gaseous mixture being passed through the fluidized bed and counter-currently contacting the copolymer product with a first gas stream to produce (i) a copolymer product having a reduced amount of said unreacted gaseous monomers and (ii) a second gas stream comprising said first gas stream and at least a portion of said unreacted gaseous monomers, the improvement which comprises:

(a) cooling a second portion of said gaseous effluent stream passing from the fluidized bed to partially condense said gaseous effluent stream to provide (1) a first liquid stream comprising a major portion of the unreacted $C_3$–$C_8$ alpha-olefin monomer in said second portion and (2) a third gas stream comprising a major portion of the unreacted ethylene in said second portion, and (b) utilizing said third gas stream as the first gas stream for counter-currently contacting the copolymer product.

2. The process of claim 1 wherein the cooling in step (a) is effected by (1) passing said second portion in indirect countercurrent heat exchange relationship first with the third gas stream and then with the first liquid stream, under conditions effective to cool said second portion, (2) passing said cooled second portion in indirect countercurrent heat exchange relationship with a mechanically cooled refrigerant under conditions effective to partially condense said cooled second portion to provide the first liquid stream and the third gas stream, and (3) separating the first liquid stream from the third gas stream.

3. A process according to claim 2 comprising the following additional step:

(c) passing the second gas stream through the fluidized bed as a portion of the gaseous mixture.

4. A process according to claim 2 comprising the following additional step:

(d) passing the first liquid stream through the fluidized bed as a portion of the gaseous mixture.

5. The process of claim 2 wherein the $C_3$–$C_8$ alpha-olefin monomer is butene.

6. The process of claim 2 wherein the $C_3$–$C_8$ alpha-olefin monomer is hexene.

7. The process of claim 2 wherein the $C_3$–$C_8$ alpha-olefin monomer is 4-methylpentene-1.

8. The process of claim 2 wherein inert gas is utilized in conjunction with said third gas stream in counter-currently contacting said copolymer product.

* * * * *